March 7, 1967     P. A. CARULLO     3,307,891

PRESTRESSED ROLLER BEARING

Filed Dec. 31, 1964                                2 Sheets-Sheet 1

PAUL A. CARULLO
INVENTOR

BY Mason, Porter, Diller & Stewart
ATTORNEYS

March 7, 1967 P. A. CARULLO 3,307,891
PRESTRESSED ROLLER BEARING
Filed Dec. 31, 1964 2 Sheets-Sheet 2

PAUL A. CARULLO
INVENTOR

BY Mason, Porter, Miller + Stewart
ATTORNEYS 3,307,891
PRESTRESSED ROLLER BEARING
Paul A. Carullo, Torrington, Conn., assignor to The Torrington Company, Torrington, Conn., a corporation of Maine
Filed Dec. 31, 1964, Ser. No. 425,104
9 Claims. (Cl. 308—213)

This application is a continuation-in-part of my co-pending application Serial No. 226,137, filed September 25, 1962, for Prestressed Roller Bearing, now abandoned.

The following specification relates to an invention of a prestressed roller bearing, especially designed for needle type roller bearings in which relatively narrow cylindrical rollers or needle type ones are used.

In order that this invention may be fully understood, the general practice in bearing manufacture is set forth here. Although bearings are made with very close tolerances, the difference between the diameter of the outer race of the bearing and the diameter of the inner race thereof is in excess of two times the roller diameter with the result that a clearance is normally assured. It will be readily apparent that it is virtually impossible to manufacture a bearing wherein there is zero clearance and at the same time there is no wedging of the rollers between the two bearing races. As a result, when a load is placed upon the bearing, there is a slight relative shifting of the inner race and outer race so that in opposition to the radial load the rollers are in direct contact with both the inner race and the outer race and remote from the load, the spacing between the races is increased. In view of the fact that the rollers are turning about the axis of the inner race, the rollers are thrown outwardly by centrifugal force and are in contact with the outer race at all times. It is also pointed out at this time that when the bearing is of the full complement type wherein adjacent rollers are not maintained in spaced relation, the bearing is so designed whereby there is nominally 0.0001 inch from roller to roller. The relationship of the rollers is such that when the rollers are contracted inwardly, they will engage the inner race in full contact. However, as is pointed out above, in operation centrifugal force will keep the rollers against the outer race.

Although it is the practice in the manufacture of even close tolerance bearings to provide the aforementioned clearances, it has long been the desire of the bearing industry to manufacture rollers bearings which have substantially no clearances between the rollers and the two races and at the same time to be certain that sufficient clearances are provided to prevent damage to the rollers and the bearing races under operating conditions. Accordingly, in accordance with this invention, it is proposed to provide a preloaded roller bearing assembly wherein the outer race member has a resilient mid-portion of concavo-convex longitudinal section, which mid-portion is resiliently deformable and against which the centers of rollers bear, the bearing assembly also including a plurality of parallel rollers disposed in rolling contact with the outer race member and the rollers being so related with respect to the outer race member whereby when the rollers are in contact with the outer race member, the inner surfaces of the rollers define a cylinder of a diameter less than the diameter of the intended inner race member whereby when the preloaded roller bearing assembly is assembled with an inner race member, the rollers will be in resilient pressure engagement with the inner race member.

One of the objects of the invention is to provide an improved construction resulting from the employment of a thin, resilient outer race that has a reduced diameter through the median portion of the cup both on the inside of the bore and on the outside resulting in a concavo-convex longitudinal cross section. By this design, the outer race or cup, when pressed into a housing, contacts the housing at the ends only, while the center portion of the race stands away from the inner wall of the housing for several thousandths of an inch.

Another object of the invention is to give a preload to the bearing assembly by reason of the reduced diameter at the center, and since the outside of the bearing race at the center does not contact the housing, there is a resilient effect preventing overloading the rollers and bearing at the time of preloading.

It is a further object of this invention to provide a bearing which runs without any radial play or clearance. This is superior to the usual bearings formed without this feature and which as a result require radial clearance in the housing to enable them to run properly. Such radial clearance varies considerably because of the cumulative manufacturing tolerances for the various parts of the bearing, the shaft, and the mounting housing and further the necessity of preventing any excessive damaging overloading.

A further object of the invention is to take care of manufacturing tolerances of the bearing parts, the shaft and the mounting housing due to the resilient effect of the thin shell of the bearing which will yield as needed without overloading the rollers, shaft and bearing.

Bearings constructed in this manner eliminate any vibration and noise due to radial clearances. With several thousandths of an inch clearance in back of the center portion of the race member, there is enough free movement, but only in such a small amount that any great radial load applied in any direction will deflect the resilient race member until it reduces this clearance in the loaded area to zero. This will then provide a solid back support for carrying the heavy load, while the area not loaded remains curved, but in effect still carrying some preload. This will hold the radial clearance to zero. As a result such bearings run much quieter and smoother than bearings without this improved design.

A still further object of the invention is to provide means through this concavo-convex area to relieve the rollers and race from undue chipping or spalling off near the roller ends due to extremely heavy concentrated loads applied to the race members at or near the ends of the rollers.

Chipping or spalling off of the thin shell bearing member is more apt to occur in roller bearings which are assembled without sufficient clearance between the shell member and the rollers, particularly when such bearings are run under heavy loads with the outer race and the inner race or shaft in slight misalignment of the shaft and housing or in deflection of the bearing support under heavy loading.

Among the objects of the invention is to provide means to permit the thin shell to reposition its resilient outer surface to accommodate varying conditions of misalignment of the shaft or housing that may occur, but then to return to its original position due to the resilient effect of its surface when conditions are restored to normal. Thus there is no permanent deformation or wear, as would be the case if the race were solid and thick without resilience.

Other objects of the invention will be apparent from the following detailed description of the preferred form of the invention as illustrated for purposes of example in the accompanying drawings in which.

Briefly described, the invention consists in providing a thin, metal race member of generally cylindrical form but with the midportion reduced in diameter and concavo-convex due to its thickness being the same as the remainder of the race member. This race member has a maximum diameter slightly greater than the space afforded by the housing. Thus, when the bearing assembly containing this race member is inserted in the housing, a slight reduction in concavity exists and the bearing is then prestressed. The effects may be heightened by providing a similar concave-convex longitudinal section for the inner race.

The bearing rollers or needles fitted within the outer race member are of such diameter that when the inner race member or the shaft, with which the assembly is used, is inserted in the bearing assembly, the concavity of the race members is reduced by pressure of the rollers.

Thus the roller bearing may yield due to misalignment or else otherwise to accommodate abnormal conditions without overloading the bearing.

The ends of the race member have sufficient clearance from the inner race or the contained shaft to accommodate the necessary deflection of the concave bearing members.

Figure 1:
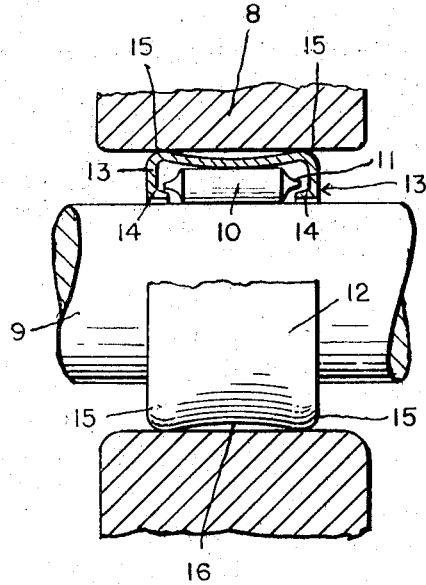
FIGURE 1 is a side view partly in section of the novel full complement bearing in a housing directly mounted around a shaft.

As shown in FIGURE 1, a housing 8 is provided within which a shaft 9 is carried by the novel prestressed roller bearing assembly.

This assembly includes cylindrical rollers 10 which in one form may be a full complement of needles. These rollers or needles are provided with tapered, reduced ends in the usual manner.

An outer race member or sleeve 12 surrounds the rollers 10. This race member 12 is made of thin sheet metal or other suitable material. It may be hardened after forming or alternatively hardened and then formed.

The ends of the race member are bent inwardly at right angles to form end flanges 13, 13. These aid in confining the rollers 10 and also preventing escape of lubricant.

Each end flange has an inturned angular ledge 14, 14 parallel to the outer portion of the race member. The ledges are of such diameter as to provide substantially the same clearance around the shaft 9 or the corresponding inner race as the concavity of the midportion of the outer raceway.

As shown in FIGURE 1, the rollers are specifically needles of which a full complement is provided in contact with each other. The reduced ends 11 are loosely confined by the ledges 14, 14, so that normally the rollers or needles will not be dislodged in handling or insertion.

The ends of the race 12 bulge outwardly to form ridges 15, 15. These are in constant contact with the inner wall of the housing 8.

The intermediate or center portion 16 of the raceway 12 is of the same thickness of metal and forms a concavo-convex area. This is separated from the inner wall of the housing 8 by several thousandths of an inch dependent upon the degree of deformation to be provided in the operation of the bearing. This portion of the raceway is resilient, so that under conditions of full load, it will be brought into fully extended contact with the housing 8. This area also provides a bearing surface for the rollers or needles. In the absence of load, the contact will be mainly at the center of the members. This will be extended in either or both directions dependent upon the direction in which the load is borne.

The vacant space within the bearing and around the needles is a retention chamber for lubricant and unaffected by the radial movement of the rollers under load. The vacant space is merely shifted by the radial movement of the rollers.

The diameters of the rollers and that of the inner surface of the raceway 12 are so related to the diameter of the internal shaft 9 or other similar race member, that prior to the positioning of the shaft 9 within the rollers, the inner surfaces of the rollers will define a cylinder of a diameter slightly less than the diameter of the shaft 9. Thus, when the shaft 9 is positioned within the rollers, the inner surface of the raceway 12 will be resiliently outwardly deflected with a preload rolling fit of the parts being assured, and the inturned ledges 14, 14 are held away from contact with the internal member. Correspondingly the reduced ends 11 of the rollers fit within the ledges 14, that is, within the annular channel or space provided between these ledges and the end flanges 13 of the race member without restriction upon the rolling of the individual rollers 10 between the inner shaft member for example and the inner surface of the outer race member 12.

The effect of the clearance in diameter at the center gives a free load to the bearing when the shaft is assembled, and since the outside of the bearing race 12 does not contact the housing 8, there is a resilient effect preventing overloading the rollers 10 and the bearing 12 at the time of assembly. The sizes of the various parts are such that when the shaft is inserted, with this preloading condition, all of the clearance on the curved surface of the race 12 is not completely removed, but a thousandth of an inch or the like remains.

In normal operation of the bearing as load is applied in any section around the bearing in excess of the free preload of the shaft, the outer surface will deflect the thousandths of an inch or like clearance present, until the outer surface contacts the housing 8 and provides a solid, even support to carry the reacted load of the bearing. The maximum deflection of this race 12 will be where the load is causing it to deflect, while in the unloaded area, the convex shape remains or will spring back or spring back and forth as the load changes around the bearing race. The snug fit of the parts, removal of all radial clearances by this method between the inner shaft, the rollers 10 and the raceway 12, makes a much quieter running bearing because there are no running radial clearances in the assembly. The preloading by the internal shaft 9 also acts to support the shaft without radial shake or clearance.

It will be evident that as the race member is pressed against the housing, the ridges of the member will slide lengthwise on the housing in proportion as the concavity of the member is reduced. This gives a freedom of sliding adjustment not possible where the race member is fitted tightly in the housing.

This is desirable where applications demand that there be no radial movement of the shaft 9 or housing 8. This avoids the radial clearances required in the usual bearings to permit them to run properly and with radial movement of the shaft 9.

The convex shape of the cup or race member 12 provides a construction in which end stress of the rollers and raceways is substantially reduced. Another advantage derived from this construction is that it provides prolonged life of the conventional roller employed with such a race, while at the same time prolonging the life of the race itself. It also provides an antifriction bearing construction in which the axial distribution of the stress will be substantially uniform.

Figure 2:
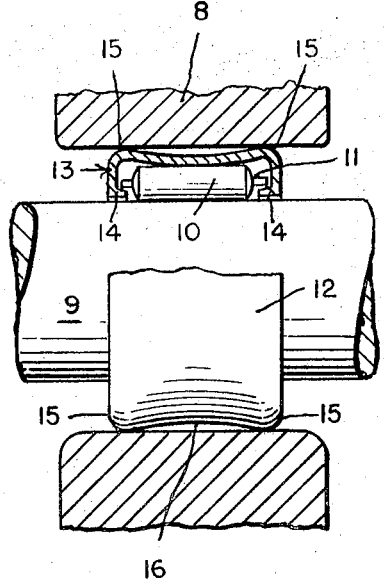
FIGURE 2 is a similar view of a caged bearing in position in a housing and on a shaft.
Figure 3:
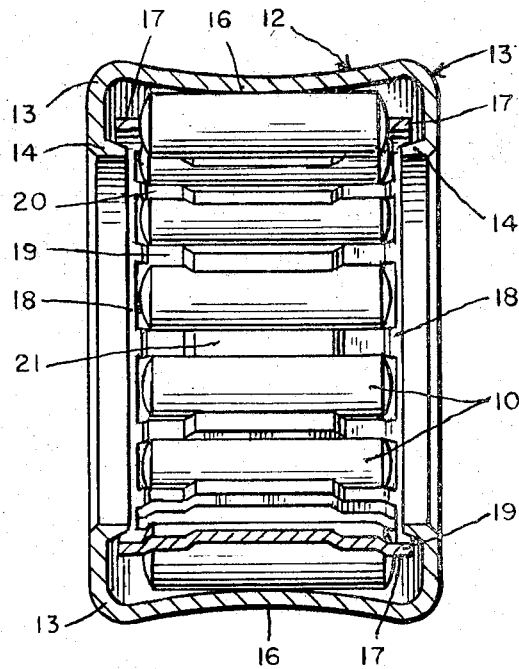
FIGURE 3 is an enlarged vertical cross-section of the bearing shown in FIGURE 2.

FIGURES 2 and 3 illustrate another form of the invention applied to caged roller bearing assemblies of the thin wall type. The same rollers 10 of generally cylindrical form and slightly convexed ends, are used in this design. The ends of the rollers are within the flanges 13, 13, but will not bear against the latter.

The rollers 10 are held in place by means of a cage 17. If desired, this cage may be previously assembled within the race 12. The cage 17 is in the form of a substantially tubular grid having circular end rings 18 of a diameter slightly greater than the inturned ledges 14, 14. The rings 18 are connected by transverse, narrow, resilient bars 19. The bars are spaced apart to provide adequate free clearance for the adjacent rollers 10.

Figure 4:
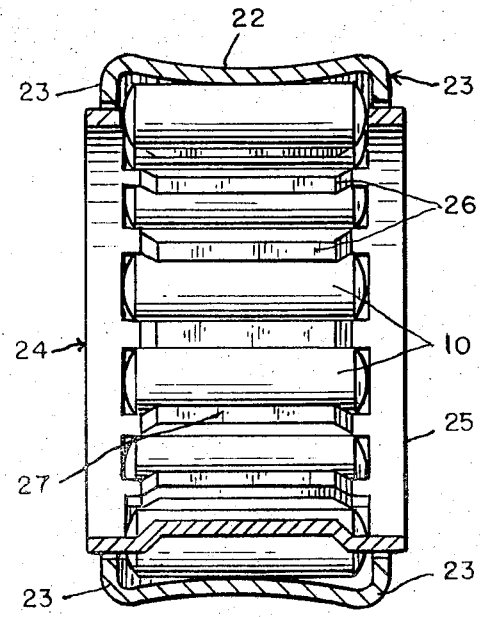
FIGURE 4 is a similar view of a modified form of of caged bearing.

In FIGURE 3, the bars 19 have been shown to be offset in two steps. The first offset 20 is such that it guides the end portions of the rollers. The center 21 of each bar 19 is further depressed to within a short distance of the inside diameter subtending the series of rollers, as shown in FIGURES 3 and 4. The centers 21 thus retain the rollers from inward displacement.

The bearing is assembled by inserting the cage within the outer cup or race, with or without rollers placed between the bars, before one end flange 13 and ledge 14 are formed. By bending the end flange 13 and ledge 14 into place, the cage is confined within the cup of the race. If the two elements are assembled together without rollers, they may be heat treated together if desired and finally each individual roller can be inserted between adjacent resilient bars 19 by an outward pressure exerted on the roller.

An alternate method of assembly is to assemble the heat treated parts, shell or race, cage, and rollers to the cup or race before one flange end 13 and ledge 14 is formed. By bending the end and ledge into place, the cage is confined within the cup of the race.

A modification of the invention is illustrated in FIGURE 4. Here the outer cup or race 22 is made with inwardly extending end flanges 23. The flanges, however, do not extend beyond the axis of the cylindrical rollers 10. It will be seen that the distances between the inner edges of the flanges 23 is only slightly greater than the length of the rollers which are free to move endwise within the intervening space.

The cage 24 is also a cylindrical grid, having end rings 24, 25. These ends are connected by bars 26.

The center 27 of each bar 26 is dropped or depressed. The extent of this depression is substantially to the inner diameter of the roller assembly. In this way the center 27 will support the cage 24 on the inner shaft and retain the rollers when the shaft is not present.

The cage is also resilient in this instance. The mode of assembly consists in first placing the cage 24 within the outer cup 22 and then springing the centers 27 apart with the roller 10 as the latter is inserted. The centers 27 spring back into normal position after passage of the roller, leaving a space less than the diameter of the confined roller. Assembly of all the hardened parts can be assembled to this cup or race and end flanges 23 formed over as described above for FIGURE 3.

Both the cage and the outer cup or race may be formed either from tubular material or may be formed from flat material and bent into circular form.

Figure 5:
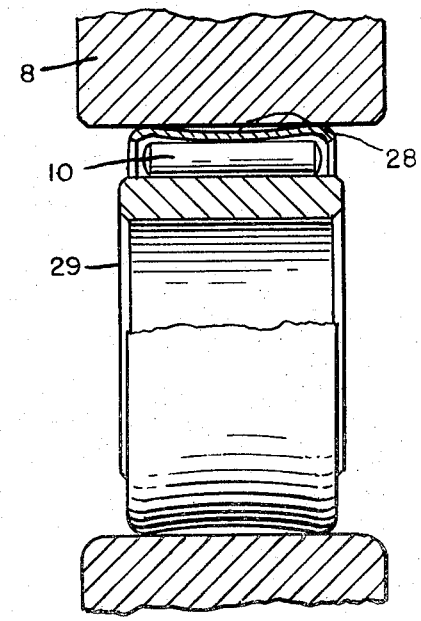
FIGURE 5 is a side view partly in section of a modified form of full complement bearing between a housing and an inner race member.

FIGURE 5 is another application of a modified bearing design having a sleeve or race 28 with a convex surface, assembled in a housing 8. There are no ends on the sleeve or race 28. The rollers 10 are conventional and could have a separator or be of the full complement design. The inner race 29 acts as a shaft and can be designed with shoulders or the surrounding design could restrict or locate these parts.

Figure 6:
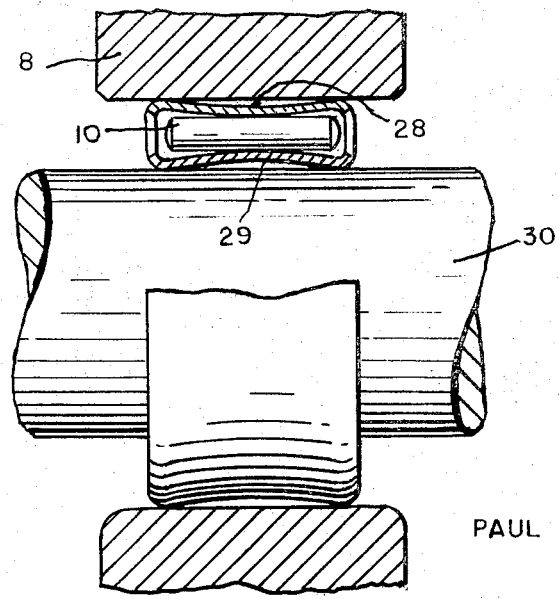
FIGURE 6 is a side view partly in section of the novel bearing in which both inner and outer raceways are curved in cross-section.

FIGURE 6 is a further form of the invention shown in FIGURE 5. The outer cup or sleeve 28 is pressed into housing 8 and the inner race or sleeve 29 is pressed on shaft 30. The inner race or sleeve 29 can have flanges bent outwardly also. The outer race or sleeve 28 can have flanges bent inwardly.

The improved thin sheet roller bearing is exceedingly well adapted for use in place of the usual bearing. This bearing is well adapted to obtain smoother and quieter running. The small amount of curved resilient surface is variably flexible so that no severe preloading or stress concentrations exist. The preloading is slight and variable because of the small clearance in back of the race.

Although several designs of the invention have been disclosed and described in detail, it is to be understood that many changes in size, shape, arrangement and detail of the various parts thereof may be made without departing from the spirit of the invention, and it is not intended to limit the scope of the invention other than by terms of the appended claims.

What I claim is:

1. A preloaded roller bearing assembly particularly adapted for use in a bearing which includes at least an outer race member, an inner race member and a series of parallel rollers disposed in rolling contact with said inner and outer race members, said preloaded roller bearing assembly comprising a series of parallel rollers and an outer race member surrounding the rollers, said outer race member having a resilient midportion of concavo-convex longitudinal section, the center of which bears on the outer surface of the rollers and which rollers when in contact with the center of said outer race member have inner surfaces which generally define a cylinder of a diameter less than the diameter of the intended inner race member whereby when said preloaded roller bearing assembly is assembled with an inner race member, said rollers will be in resilient pressure engagement with the inner race member.

2. The roller bearing assembly of claim 1 wherein said race member has inwardly turned ends opposite the ends of the rollers.

3. The roller bearing assembly of claim 1 wherein said rollers have trunnion ends and said race member has inwardly turned ends with peripheral ledges underlying the trunnion ends of the rollers.

4. The roller bearing assembly of claim 1 wherein said rollers are circumferentially spaced relation, and a generally cylindrical cage is mounted within the race member and serves to retain the rollers in the spaced parallel relation.

5. In combination, a series of parallel rollers, a race member within the rollers, an outer race member surrounding said rollers, said outer member having a resilient midportion of concavo-convex longitudinal section the center of which bears on the outer surface of the rollers, inwardly turned flanges on the outer race member and a housing for the outer race member, said inner race member holding the rollers and outer race member resiliently against the housing.

6. In combination a series of parallel rollers, a bearing sleeve within the rollers, an outer race member surrounding said rollers, said outer member having a resilient midportion of concavo-convex longitudinal section the center of which bears on the outer surface of the rollers, inwardly turned flanges on the outer race member and a housing for the outer race member, said bearing sleeve holding the rollers and outer race member resiliently against the housing.

7. In combination with a housing and an inner race member, a roller bearing assembly comprising an outer race member having a thin resilient shell with peripheral end flanges in contact with the housing and having a midportion of reduced diameter and concavo-convex in longitudinal section, and a series of bearing rollers between the inner race member and the outer race member and in contact with the midportion only of the outer race member.

8. In combination with a housing and an inner race member, a roller bearing assembly comprising an outer race member having a thin resilient shell with peripheral end flanges slidably fitted within the housing, said member having a midportion of reduced diameter and concavo-convex in longitudinal section, and a series of bearing rollers between the inner race member and the outer race member and in contact with the midportion only of the latter.

9. In combination, a fixed member, an opposite rotary member, a series of interposed bearing rollers, a generally cylindrical race between said rollers and each of said members, each race having end flanges in contact with one of said members and a resilient concavo-convex midportion in contact with an opposite surface of each roller.

References Cited by the Examiner

UNITED STATES PATENTS

| 2,606,798 | 8/1952 | Hickling | 306—213 |
| 2,928,702 | 3/1960 | Pitner | 308—216 |

MARTIN P. SCHWADRON, *Primary Examiner.*

F. SUSKO, *Assistant Examiner.*